(12) United States Patent
Beery et al.

(10) Patent No.: US 11,833,483 B2
(45) Date of Patent: Dec. 5, 2023

(54) DEVICE AND METHOD FOR GENERATING GAS BUBBLES IN A LIQUID

(71) Applicant: Steffen Hartmann Recyclingtechnologien GmbH, Thale (DE)

(72) Inventors: Matan Beery, Berlin (DE); Johanna Schulz, Berlin (DE); Gregor Tychek, Berlin (DE); Thorsten Gabrys, Berlin (DE)

(73) Assignee: Steffen Hartmann Recyclingtechnologien GmbH, Thale (DE)

( * ) Notice: Subject to any disclaimer, the term of this patent is extended or adjusted under 35 U.S.C. 154(b) by 775 days.

(21) Appl. No.: 16/965,338

(22) PCT Filed: Jan. 21, 2019

(86) PCT No.: PCT/EP2019/051381
§ 371 (c)(1),
(2) Date: Jul. 28, 2020

(87) PCT Pub. No.: WO2019/145257
PCT Pub. Date: Aug. 1, 2019

(65) Prior Publication Data
US 2021/0113976 A1    Apr. 22, 2021

(30) Foreign Application Priority Data
Jan. 29, 2018   (DE) .................... 10 2018 101 895.9

(51) Int. Cl.
*B01F 7/10*       (2006.01)
*B01F 27/73*      (2022.01)
(Continued)

(52) U.S. Cl.
CPC .......... *B01F 27/73* (2022.01); *B01F 23/2331* (2022.01); *B01F 23/2332* (2022.01);
(Continued)

(58) Field of Classification Search
CPC .......... B01F 23/23311; B01F 23/23314; B01F 23/233642; B01F 23/23123;
(Continued)

(56) References Cited

U.S. PATENT DOCUMENTS 2,540,948 A * 2/1951 Jeffery .................... C02F 3/205
                                                  415/80
2,996,287 A * 8/1961 Audran ................... B01F 27/81
                                                  261/87
(Continued)

FOREIGN PATENT DOCUMENTS

CN    101816023 A    8/2010
DE    19528073 A1 *  2/1997   .............. A61M 1/32
(Continued)

OTHER PUBLICATIONS

English translation of DE 19528073 A1 (Year: 1997).*
English translation of EP 3381868 A1 (Year: 2018).*
English translation of DE 102019101483 A1 (Year: 2020).*

*Primary Examiner* — Charles S Bushey
(74) *Attorney, Agent, or Firm* — THE WEBB LAW FIRM

(57) ABSTRACT

A device for generating gas bubbles in a liquid in a container includes a rotatable gas-permeable hollow shaft arranged in a container, gassing discs arranged on the hollow shaft and spacers arranged between the gassing discs, gassing discs and spacers being arranged alternately on the hollow shaft in gas-tight contact with one another, a feed line for a compressed gas into the interior of the shaft, spacer having a centered opening (O) for receiving the shaft and at least two chambers, the chambers being equally spaced around the
(Continued)

centered opening, where the centered opening and the chambers at least partially overlap, where the centered opening and the chambers are in communication with one another at least in the overlap region, so that the compressed gas can flow from the shaft into in each case a chamber of the spacer and enter the gassing discs from the chamber of the spacer.

20 Claims, 9 Drawing Sheets

(51) Int. Cl.
| | | |
|---|---|---|
| *C02F 1/24* | (2023.01) | |
| *C02F 1/44* | (2023.01) | |
| *C02F 1/52* | (2023.01) | |
| *B01F 23/233* | (2022.01) | |
| *B01F 23/231* | (2022.01) | |
| *B01F 27/115* | (2022.01) | |
| *C02F 101/30* | (2006.01) | |
| *B01F 101/00* | (2022.01) | |

(52) U.S. Cl.
CPC .... *B01F 23/23123* (2022.01); *B01F 27/1155* (2022.01); *C02F 1/24* (2013.01); *C02F 1/444* (2013.01); *C02F 1/5245* (2013.01); *B01F 23/23311* (2022.01); *B01F 23/23314* (2022.01); *B01F 23/231267* (2022.01); *B01F 23/233642* (2022.01); *B01F 2101/305* (2022.01); *C02F 2101/30* (2013.01)

(58) Field of Classification Search
CPC .......... B01F 23/231267; B01F 23/2331; B01F 23/2332; B01F 27/73; B01F 27/1155; B01F 2101/305; C02F 1/24; C02F 1/444; C02F 1/5245; C02F 2101/30
USPC ...................................................... 261/87, 92
See application file for complete search history.

(56) References Cited

U.S. PATENT DOCUMENTS

| | | | |
|---|---|---|---|
| 3,891,729 A | | 6/1975 | Ebner et al. |
| 5,626,819 A | * | 5/1997 | Novello .................. A61M 1/32 |
| | | | 261/92 |
| 10,898,867 B2 | * | 1/2021 | Beery ................. B01F 23/2332 |
| 2006/0060521 A1 | | 3/2006 | Harms et al. |
| 2010/0213624 A1 | | 8/2010 | Madsen |
| 2015/0114910 A1 | | 4/2015 | Repke et al. |
| 2018/0104659 A1 | | 4/2018 | Beery et al. |

FOREIGN PATENT DOCUMENTS

| | | | | |
|---|---|---|---|---|
| DE | 102004003033 A1 | | 8/2005 | |
| DE | 102015208694 A1 | | 11/2016 | |
| DE | 102019101483 A1 | * | 7/2020 | .............. C02F 3/005 |
| EP | 3381868 A1 | * | 10/2018 | ................ C02F 1/38 |
| SU | 1089155 A1 | | 4/1984 | |
| WO | 2013167358 A1 | | 11/2013 | |
| WO | 2015048904 A1 | | 4/2015 | |
| WO | 2016180853 A1 | | 11/2016 | |

* cited by examiner

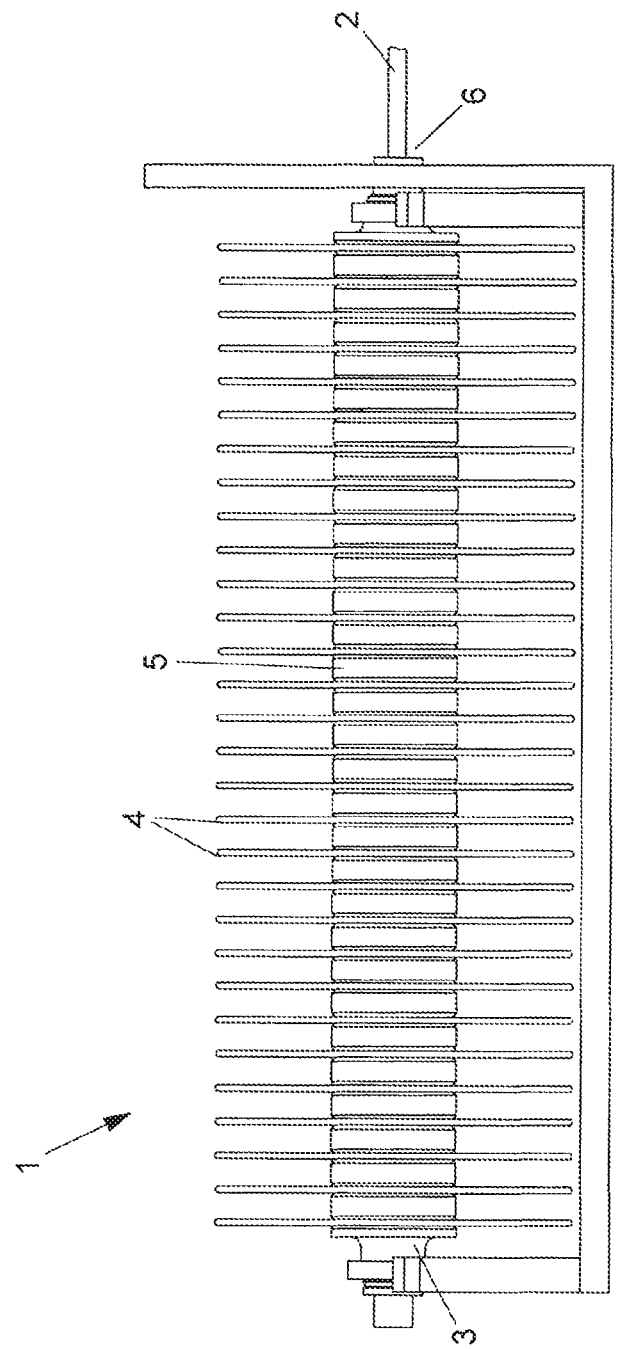

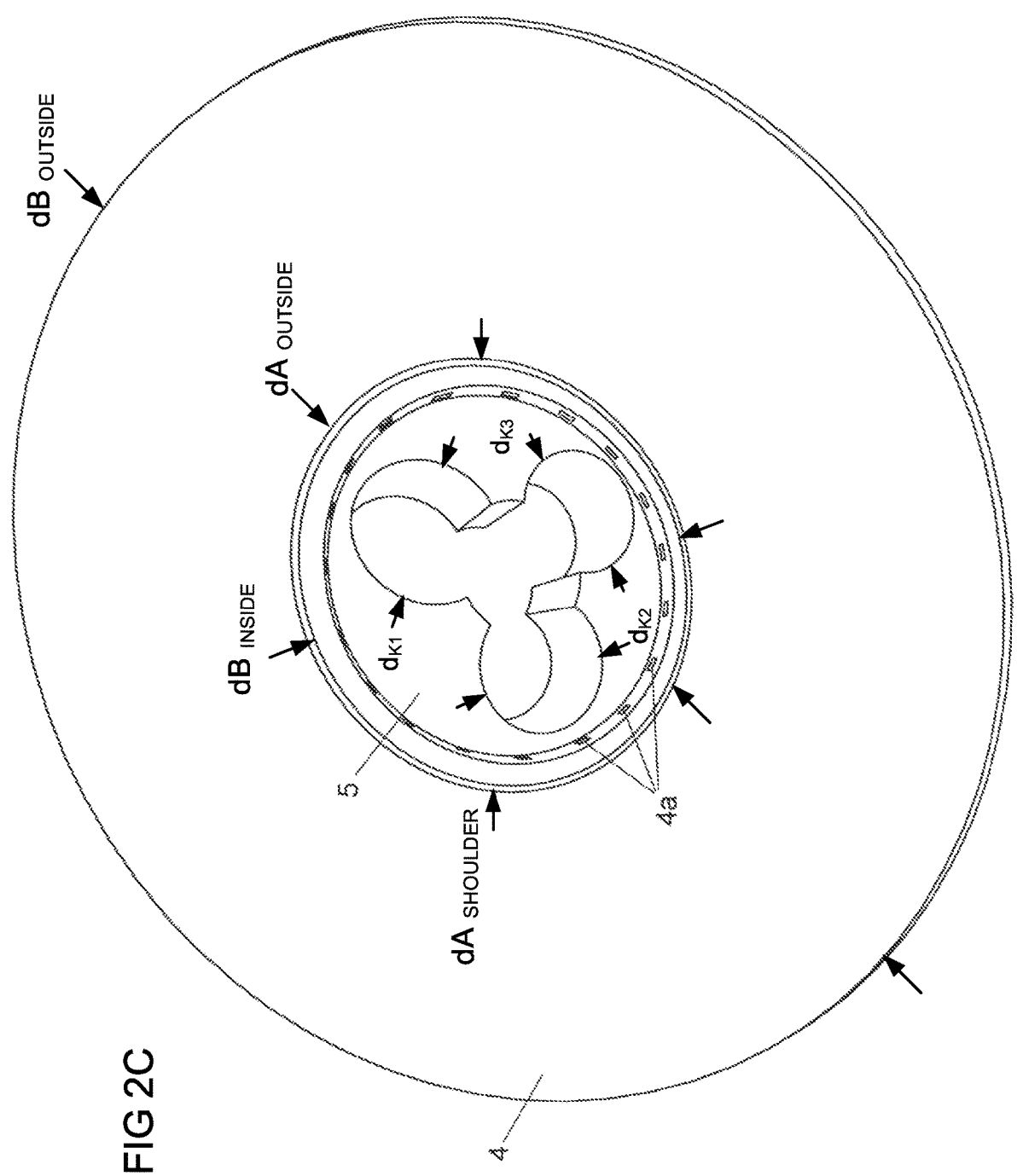

200
DEVICE AND METHOD FOR GENERATING GAS BUBBLES IN A LIQUID

CROSS-REFERENCE TO RELATED APPLICATIONS

This application is the United States national phase of International Application No. PCT/EP2019/051381 filed Jan. 21, 2019, and claims priority to German Patent Application No. 10 2018 101 895.9 filed Jan. 29, 2018, the disclosures of which are hereby incorporated by reference in their entirety.

BACKGROUND OF THE INVENTION

Field of the Invention

The disclosure relates to a device for generating gas bubbles in a liquid, a method for generating gas bubbles in a liquid using such a device, a plant for purifying water comprising such a device and a method for purifying water using such a plant.

Technical Considerations

Gas bubbles in liquids are necessary for a number of different applications, such as for the purpose of dissolving gas in the liquid. An increasingly interesting and important field of application for gas bubbles in liquids is the purification of water and other liquids by a so-called flotation process.

Flotation is a gravity separation process for separating solid-liquid or liquid-liquid systems. Gas bubbles, for example from air, are generated and introduced into the liquid phase. Hydrophobic particles in the liquid phase, such as organic substances or biological waste products, attach themselves to these also hydrophobic bubbles and rise to the surface due to the buoyancy caused by the gas bubbles. At the surface of the liquid phase, these agglomerates accumulate to form a sludge layer which can be easily separated mechanically.

The flotation effect is stronger the higher the specific surface of the rising gases is, to which the hydrophobic particles from the water to be cleaned can attach themselves. Accordingly, the formation of micro-bubbles with diameters of 10 to 100 µm in the form of a swarm of bubbles (also called "white water") is desirable.

One possibility of introducing gas in the form of tiny bubbles into the liquid to be purified is by means of the well-known DAF process (dissolved air flotation). In this process, a gas in dissolved form in a liquid at increased pressure is introduced into the liquid to be purified and the pressure drop in the liquid to be purified causes the gas to escape in the form of tiny bubbles with a diameter in the micrometer range. The DAF process enables a very good separation of microalgae, other microorganisms, oils, colloids and other organic and inorganic particles from highly loaded wastewater, but requires a relatively high energy consumption due to the introduction of air into the liquid by means of a saturation column combined with a high energy consumption. At high temperatures (above 30° C.) and salinity levels (above 30000 ppm) the process becomes increasingly inefficient or even stops working.

A further possibility for the introduction of very small gas bubbles into a liquid while avoiding the high energy consumption associated with the DAF process is described in WO 2013/167-358 A1, among others, in which the gas is introduced by direct injection of a gas through a gassing membrane into the liquid to be purified. The recycling stream and saturation column that are otherwise common in the DAF process are omitted, as the gas can be taken directly from a compressed air line or a gas cylinder, for example.

WO2016/180853 A1 describes a device for generating gas bubbles in a liquid, in particular micro-bubbles, which enables bubble generation by means of suitable gassing discs. For this purpose, the compressed gas is introduced into the horizontally mounted rotatable hollow shaft (consisting of an inner, smaller and outer, larger hollow shaft) and is directed into the liquid through the gassing discs, which consist, for example, of a ceramic membrane with a gas channel. The use of two hollow shafts, one inside the other, enables an even and symmetrical pressure distribution within the larger hollow shaft. As a result, the discs are symmetrically supplied with gas and an even bubble production is achieved in the medium to be gassed. However, the disadvantage here is the complex construction of an inner and outer hollow shaft and the specified, necessary arrangement of the gassing discs above a gas supply opening in the outer hollow shaft in order to achieve an efficient introduction of gas into the gassing discs.

SUMMARY OF THE INVENTION

An object underlying the proposed solution was thus to provide a device for the generation of gas bubbles in a liquid, which can be produced at low cost and enables a low-cost, practical and durable large-scale technical application, especially in the context of the purification of waste water or salt water.

This object is solved with a device with features as described herein.

Accordingly, a device for generating gas bubbles in a liquid is provided in a container, the device comprising the following elements:
- at least one rotatable gas-permeable hollow shaft arranged in at least one container,
- gassing discs arranged on the at least one hollow shaft and spacers arranged between the gassing discs, wherein gassing discs and spacers are arranged alternately on the hollow shaft in gas-tight contact with one another,
- at least one supply line for at least one compressed gas into the interior of the at least one rotatable hollow shaft.

In accordance with the solution, each of the spacers has at least one centered opening (O) for receiving the hollow shaft and at least two chambers (K1, K2), wherein the at least two chambers (K1, K2) are evenly spaced around the centered opening (O).

According to the solution, the radii of the centered opening (O) and the radii of the at least two chambers (K1, K2) overlap or overlap, so that the centered opening (O) and the at least two chambers (K1, K2) are in open communication with each other at least in the overlap area. In other words, the overlap area is free of material.

The open communication of the centered opening and the chambers allows the compressed gas to flow from the hollow shaft into at least one of the chambers (K1, K2) of the spacer. The gas can then continue to enter the gassing discs from the at least one chamber (K1, K2) of the spacer.

Since a gassing disc is preferably arranged between two spacers, the gas is guided from the at least one gas-filled chamber of the spacer into the space between two spacers, the space being filled by a gassing disc, and is guided from this space into the gassing disc via suitable gas supply or gas access openings in the gassing disc. In this way, the discs are symmetrically supplied with gas and a uniform microbubble production is achieved in the medium to be gassed or in the liquid to be cleaned.

In a preferred embodiment, the present device comprises at least one rotatable gas-permeable hollow shaft arranged horizontally in the at least one container.

The gassing discs can have any geometrical shape that is conceivable and useful for the described function of the gassing discs.

In a preferred embodiment, circular aeration discs are provided on this at least one hollow shaft vertically to the hollow shaft and circular spacers are provided between the aeration discs, wherein aeration discs and spacers are alternately arranged on the hollow shaft in gas-tight contact with each other.

In another preferred embodiment, each of the spacers has at least one centered circular opening (O) for receiving the hollow shaft and at least three circular chambers (K1, K2, K3), the at least three chambers (K1, K2, K3) being equally spaced around the centered opening (O). The arrangement of the three chambers can also be described by the geometry of a three-leaf clover. However, it is also generally possible that the spacer has more than three, e.g. four, five or six chambers. These chambers can also be in the form of circular segments.

As will be explained later, the ceramic membrane, for example, has a pore size of two micrometers, which causes the formation of bubbles with a bubble size between 40 and 60 µm. Due to the rotation of the hollow shaft and the ceramic disks mounted on the hollow shaft, shear forces act on the gas bubbles emerging from the ceramic disks, which influence the size of the gas bubbles and the swarm of bubbles. The strength or size of the shear forces acting therefore has a direct influence on the effectiveness of bubble formation. The strength of the shear forces themselves is in turn influenced by the rotational speed of the hollow shaft, whereby the rotational speed of the hollow shaft can be up to 400 rpm.

Subsequently, the dirt particles (e.g. organic substances or biological substances) in the liquid are deposited on the bubbles formed in the liquid in the form of a swarm of bubbles and rise to the liquid surface in the form of a corresponding gas bubble agglomerate. The solid layer formed on the liquid surface can then be mechanically separated. The specific combination of (direct) gas injection into the supply line and hollow shaft as well as the vertical arrangement of the spacers and gassing discs on the horizontal hollow shaft enables the generation of micro-bubbles in an energetic and thus cost-effective manner that makes large-scale industrial application of the device reasonable.

As stated above, each spacer has at least one centered opening (O) with a diameter dO for receiving the hollow shaft and at least two, in particular at least three circular chambers (K1, K2, K3) each with a diameter dK1, dK2, dK3.

Preferably, the geometries, especially the diameters of the chambers of the spacer are the same in each case. In one variant, these diameters are between 5 and 50 mm, preferably between 15 and 50 mm, preferably between 20 and 35 mm.

In one variant, the diameters of the chambers are the same and equal to dO. However, it is also possible that the diameters of the chambers are the same but not equal to dO. In the latter case dO can be, for example, between 15 and 20 mm and the diameters of the chambers can be smaller than 10 mm, for example between 5 and 10 mm.

In general, the diameters of the chambers and dO and thus of the shaft and the chamber are variable and are matched to each other.

The thickness of the spacer depends on the width of the tank in which the present device is used and the number of gassing discs required for gassing. In one embodiment, the spacer is made in one piece. In general, however, it is also possible and conceivable to manufacture the spacer from several parts (e.g. three parts) and to connect these parts gas-tight and force-locked to each other, e.g. by gluing or welding.

In another embodiment, the spacer is made of a metallic or non-metallic material, preferably plastic. Polyoxymethylene (POM) or polyvinyl chloride (PVC) can be used as the preferred material.

In a further embodiment, the at least one spacer with an outer diameter $dA_{outside}$ has on at least one of its circular sides a shoulder with a diameter $dA_{shoulder}$, where $dA_{shoulder}$ is smaller than $dA_{outside}$. The diameter or radius of the shoulder is thus smaller than the total diameter of the spacer. Thus, the outer diameter $dA_{Outside}$ can be between 50 and 150 mm, preferably between 70 and 120 mm, particularly preferably between 90 and 110 mm, and the shoulder diameter $dA_{shoulder}$ can be between 30 and 100 mm, preferably between 50 and 90 mm. In one variant, $dA_{outside}$ is e.g. 110 mm and $dA_{shoulder}$ is e.g. 89.9 mm. In general, the shoulder diameter is dependent on the inner diameter of the gassing disc.

This at least one shoulder of the spacer serves to accommodate the gassing disc. In particular, the shoulder can be described as a centring shoulder on which the gassing disc is placed. A groove (O-ring groove) is also provided for sealing between the gassing disc and the spacer. The gas-tight contact between the spacer and the aeration disc is achieved by placing the aeration disc on the shoulder of the spacer and sealing between the aeration disc and the spacer (on the outer radius of the spacer) via the inserted O-ring.

In one embodiment, the gassing disc is in the form of a ring with an inner circumference with an inner diameter $dB_{inside}$ and an outer circumference with an outer diameter $dB_{outside}$, the inner diameter $dB_{inside}$ of the gassing disc (with a small tolerance of approx. 2/10 mm) corresponding to the diameter $dA_{shoulder}$ of the (centering) shoulder of the spacer.

In a further embodiment of the present device, the gassing disc has gas openings evenly distributed along the inner circumference. Thus the openings can be approx. 2×5 mm in size and arranged at a distance of 13 mm from each other. The size and spacing of the gas openings can, however, be chosen at will.

The gas flowing into the chambers of the spacer via the hollow shaft is distributed in the (gas-tight) space between two spacers filled by the gassing disc and enters the gas openings of the gassing disc.

The gassing disc typically has an outer diameter between 100 and 500 mm, preferably between 150 and 350 mm. Ceramics, especially aluminium oxide $\alpha\text{-}Al_2O_3$, have proven to be a particularly suitable material for the gassing discs. However, other ceramic oxides and non-oxides such as silicon carbide or zirconium oxide can also be used.

In a further embodiment of the present device, the at least one gassing disc consists of a ceramic material with an average pore size between 0.05 µm and 20 µm, preferably 0.1 and 10 µm, in particular preferably between 2 and 5 µm. A pore size of 2 µm or 3 µm is most advantageous.

The mean bubble diameter of the gas bubbles introduced into the liquid via the gassing disc or gassing membrane can be between 10 µm to 200 µm, preferably between 20 µm to 100 µm, especially preferably 30 to 80 µm, and very preferably 50 µm. The generation of bubbles at the gassing membrane or gassing disc can be influenced in particular by a suitable gas volume flow and pressure. The higher the pressure, the more and the larger the bubbles are formed. The set volume flow rate plays only a minor role in this case.

It is further provided that on the at least one rotatable hollow shaft between 2 and 100, preferably between 10 and 50, especially preferably between 15 and 30 gassing discs and spacers are arranged.

In a variant of the present device, the at least one hollow shaft rotates at a rotational speed between 50 and 400 rpm, preferably between 100 and 300 rpm, in particular preferably between 180 and 220 rpm. The speed of rotation depends on the size of the gassing discs. For example, the rotational speed for small gassing discs (e.g. d=152 mm) can be 180-200 rpm, while the rotational speed for large gassing discs (e.g. d=312 mm) is 100-120 rpm. The rotation speed of the hollow shafts and thus also the rotation speed of the gassing discs as well as the gas quantity and gas pressure can be changed online (life) during operation of the device depending on the desired bubble formation, i.e. the quantity and size of the bubbles.

In another variant of the present device, the gas to be introduced is at least one compressed gas selected from a group consisting of air, carbon dioxide, nitrogen, ozone, methane or natural gas. Methane is used in particular for the removal of oil and gas from a liquid, for example in the case of the purification of a liquid produced during fracking. Ozone, in turn, can be used to purify water from aquaculture due to its oxidative and antibacterial properties.

The compressed gas is fed as described above into the at least one supply line and subsequently into the at least one hollow shaft directly without liquid carrier. Correspondingly, the compressed gas is injected directly from a gas reservoir, such as a gas cylinder or a corresponding gas line. The gas therefore does not require a liquid carrier, as for example is the case with the DAF so that a recycling stream and a saturation column are omitted and no compression energy is required to achieve a high pressure level in the DAF recycling stream. A further advantage of the direct injection of a compressed gas without liquid carrier is that it enables the simple and low-energy generation of microbubbles.

The gas pressure of the gas introduced into the at least one hollow shaft is between 1 and 5 bar, preferably between 2 and 3 bar. To reach this pressure level in the hollow shaft, the at least one compressed gas is introduced into the gas supply line at a pressure between 5 and 10 bar. In general, the pressure of the introduced gas must be greater than the sum of the pressure in the shaft and pressure losses. The pressure curve within the hollow shaft is preferably constant.

In another variant of the present device, the at least one hollow shaft is made of stainless steel, such as V2A or 4VA, Duplex or Super Duplex material, or plastic. The total diameter of the hollow shaft is between 10 and 50 mm.

The hollow shaft consists of a gas-permeable material (e.g. perforated material), so that the gas can enter the chambers of the spacer from the interior of the hollow shaft and from there into the gassing discs. The gas permeability of the material of the hollow shaft can be effected by holes with a diameter of 1 to 5 mm, which are arranged or distributed at different positions. It would also be conceivable to use slots inserted into the material or a (rigid) net.

The hollow shaft has a so-called shaft end piece at both ends. The shaft end pieces serve on the one hand to provide a gas-tight seal for the gassing disc/spacer combination, on the other hand to clamp this combination and on the third to accommodate a corresponding shaft bearing of the hollow shaft. Furthermore, it is provided that the at least one hollow shaft is arranged via the shaft end pieces in two shaft holders each with corresponding bearings.

At one end or at one shaft end piece, in a special variant, at least one supply line for the compressed gas into the hollow shaft and at least one drive for rotating the hollow shaft are provided together. Air supply and hollow shaft drive are thus arranged in one part on the same side or at the same end of the hollow shaft. It is also possible, however, that air supply and drive are provided at different or opposite ends of the hollow shaft. Sealing and air supply at the drive end is achieved by means of a modified mechanical seal. Motors for driving hollow shafts are known and can be selected in many ways depending on the size of the plant.

The shaft end piece on the drive and gas supply side is materially connected to the hollow shaft. This results in a gas-tight as well as tensile and torsionally rigid connection. A shaft nut is located on the side opposite the drive. The outer shaft serves as a tie rod. By tightening the shaft nut, the shaft end piece, which can be moved on the hollow shaft, on the side facing away from the drive, the gassing disc/spacer combination with the O-rings in between, is clamped and sealed gastight against the medium.

The drive for the device may be located outside or inside the basin or container in which the device is immersed and used.

The device of the proposed solution is used in a method for generating gas bubbles in a liquid in a container, the method comprising the following steps:
  introducing a compressed gas into the at least one supply line, whereby the compressed gas is preferably introduced directly into the supply line without liquid carrier;
  introducing the compressed gas into the interior of the at least one, in particular horizontally arranged, rotatable hollow shaft, the at least one hollow shaft rotating at a rotational speed of between 50 and 400 rpm, preferably between 100 and 300 rpm, in particular preferably between 180 and 220 rpm, and
  introducing the compressed gas into the liquid via the spacers and gassing discs, which are arranged in particular vertically on the rotating hollow shaft, producing gas bubbles.

With the present method it is possible to produce bubbles in the liquid with a bubble size between 1 µm and 200 µm, preferably between 20 µm and 100 µm, especially preferably between 30 and 89 µm, very preferably between 45 µm and 50 µm.

In a preferred variant, the present device is used for the generation of gas bubbles in a plant for the purification of a liquid, preferably water, in particular for the purification of salt water or its pre-purification, of sludge-containing waste water and other polluted liquids.

Such a plant for purifying a liquid, such as water, comprises at least one container with a device for generating gas bubbles according to the above description and at least one container (flotation cell) for receiving the at least one liquid with gas bubbles, said container having at least one filtration unit for separating organic components contained in the liquid.

In a variant of the present arrangement, at least one flocculation unit for receiving the liquid to be purified and for receiving at least one flocculant for flocculating components contained in the liquid may be connected upstream of the container with the device for generating gas bubbles.

In a further variant of the present plant, the at least one flocculation unit, the at least one device for generating gas bubbles and the at least one container (flotation cell) with the at least one filtration unit are arranged relative to one another in such a way that they are in liquid communication with one another, so that the liquid to be purified to which the flocculating agent has been added is transported from the flocculation unit into the device for generating gas bubbles and subsequently from this device into the container (flotation cell) with the filtration unit.

The flocculation unit can either be designed as a separate unit separate from the other containers or be connected to the other containers in one piece. To the liquid to be purified, such as the water to be purified, a suitable flocculant, such as $Fe^{3+}$ or $Al^{3+}$ salts for example $FeCl_3$, is introduced and mixed intensively with the liquid, using a stirrer or a static mixer if necessary. The liquid mixed with the flocculant in the flocculation unit is then transferred, preferably in a liquid flow, into the at least one vessel containing the device for generating gas bubbles, the liquid flow in this vessel being mixed with gas bubbles introduced via the device for generating gas bubbles.

The agglomerate of gas bubbles and flocculated organic components which forms in this process is then fed into the further vessel (flotation cell) with the at least one filtration unit, whereby the gas bubble agglomerate and the flocculated organic components rise to the surface of the liquid in the flotation cell, accumulate there and are mechanically separated. The liquid thus freed from the majority of the organic components is finally removed by the filtration unit arranged at the bottom of the flotation cell and fed to further treatment steps. Accordingly, in an embodiment of the present plant, the at least one filtration unit in the flotation cell is arranged below the layer formed by the flocculated organic components which are floated up. It is preferred in particular if the at least one filtration unit is arranged at the bottom of the flotation cell and is provided in the liquid area of the flotation cell, suitably submerged.

In particular, the filtration unit has a rectangular shape adapted to the tank (flotation cell). The length of the filtration unit preferably corresponds to 0.5 to 0.8 times the length of the flotation cell, in particular preferably 0.6 times the length. The width of the filtration unit preferably corresponds to 0.6 to 0.9 times, in particular preferably 0.8 times the width of the flotation cell. Thus, the filtration unit does not extend completely over the entire width of the flotation cell, but rather has a small distance to the long side walls of the flotation cell. In terms of height, the filtration unit is designed to be between 0.1 and 0.9 times, preferably 0.6 to 0.7 times, the height of the tank (flotation cell). Of course, other dimensions for the filtration unit to be used are also conceivable.

In a preferred embodiment, the at least one filtration unit is in the form of a ceramic filtration membrane, in particular in the form of a ceramic micro- or ultrafiltration membrane. Such ceramic filtration membranes have a high chemical resistance and long service life. In addition, ceramic filtration membranes are more permeable to water and less susceptible to fouling, as they have a higher hydrophilicity than polymer membranes. Due to their mechanical stability, no pre-screening is required. A membrane module with an average pore size of 20 nm to 500 nm, preferably 100 nm to 300 nm, and especially preferably 200 nm, has proven to be particularly suitable. The preferred filtration membrane module can consist of several plates, one or more tubes or other geometric shapes. Alumina in the form of $\alpha$-$Al_2O_3$ has proven to be a particularly suitable ceramic material, but other ceramic oxides or non-oxides such as silicon carbide or zirconium oxide can also be used in the filtration unit.

In another preferred embodiment, the plant, here in particular the flotation cell, includes a means of aerating the filtration unit in order to aerate the at least one filtration unit in a suitable manner. A suitable aeration means can be in the form of perforated hoses or pipes, for example. The aeration agent can be fed with air to apply high shear forces on the surface of the filtration unit to prevent or minimize fouling on the membrane surface. Further possibilities to prevent or reduce fouling of the filtration unit are the treatment with suitable chemical substances, such as citric acid to prevent inorganic fouling or a suitable oxidizing agent, such as sodium hydrochloride to reduce biological fouling.

Accordingly, the described plant can be used in a process for the purification of a liquid, in particular for the purification of water such as for the purification or pre-purification of seawater. Such a process comprises the following steps:

optional introduction of the liquid to be purified into at least one flocculation unit and addition of at least one flocculant to the liquid to be purified for flocculation of components contained in the liquid, such as organic components, transferring the liquid optionally mixed with the at least one flocculating agent into at least one downstream container with a device for producing gas bubbles and contacting the liquid optionally mixed with the flocculating agent with the gas bubbles introduced into this container to form a gas bubble agglomerate, in particular a floc micro gas bubble agglomerate, transferring the liquid mixed with the gas bubbles and the optional flocculating agent into a flotation cell, whereby the gas bubble agglomerate which has risen to the surface of the flotation cell is separated, and removing the liquid freed from the gas bubble agglomerate through the at least one filtration unit arranged in the flotation cell, and Feeding the liquid drawn off by the filtration unit to further treatment steps.

Accordingly, the present process represents a hybrid process consisting of gas bubble generation using gas flotation, microflotation and membrane filtration arranged vertically on a hollow shaft in a single device unit.

BRIEF DESCRIPTION OF THE DRAWINGS

The solution is explained in more detail below with reference to the figures in the drawings by means of an example.

DETAILED DESCRIPTION

Figure 1B:
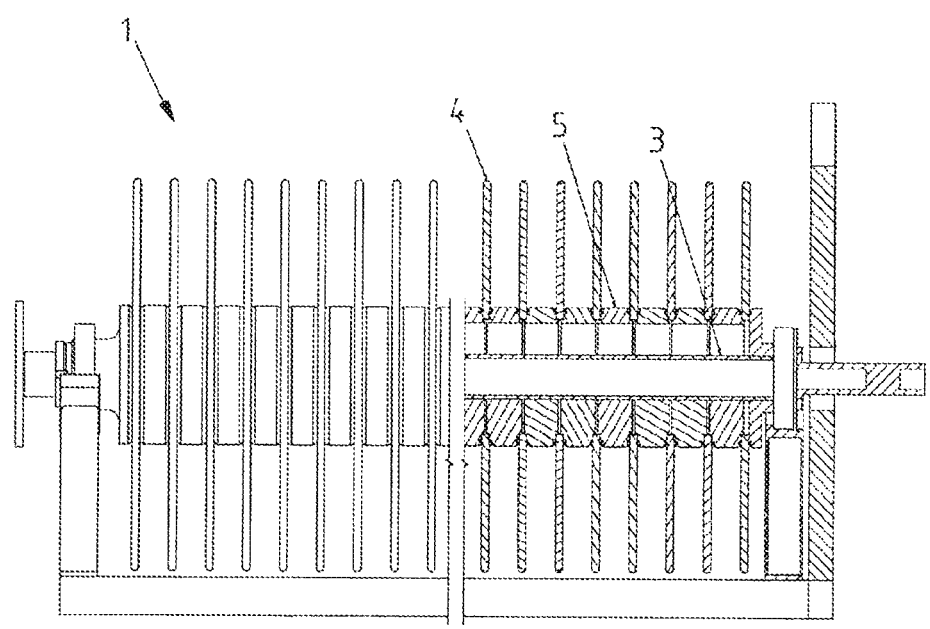
FIG. 1A a first schematic side view of a device for generating gas bubbles in a liquid according to an embodiment, FIG. 1B a second schematic side view of a device for generating gas bubbles in a liquid according to an embodiment, FIG. 2A a first schematic side view of a spacer used in the device for generating gas bubbles in a liquid.

A general structure of a first embodiment of the device for generating gas bubbles according to the solution is shown in FIG. 1A.

The side view of FIG. 1A comprises a device 1 with a supply line 2 for the compressed gas, a hollow shaft 3 and with gassing discs 4 and spacers 5 alternately arranged on the hollow shaft 3. The compressed gas is fed through the hollow shaft 3 into the spacers 5 and further into the gassing discs 4.

In the embodiment shown in FIG. 1A, several circular gassing discs made of a ceramic material are arranged on the hollow shaft. The ceramic discs are made of aluminum oxide, have an outer diameter of 152 mm and an inner diameter of 25.5 mm. The membrane surface is between 0.036 m² and the pore size of the gassing discs is in the range of 2 μm. The gas is introduced from the hollow shaft 3 into a cavity of the ceramic disk 4 and penetrates from the interior of the cavity through the pores of the ceramic material into the liquid to be cleaned, which is provided around and above the hollow shaft provided with the gassing disks, under formation of micro-bubbles with a bubble size of approx. 45 to 50 μm. The gassing discs 4 are arranged on the hollow shaft by means of stainless steel or plastic fastenings. The distance between the gassing discs corresponds to the thickness of the spacers 5.

Together with the gas supply line 2, a suitable device 6 for moving the hollow shaft is provided on the same shaft end piece. This device may be in the form of a motor which transmits the corresponding rotational movement to the hollow shaft via several gears.

The embodiment shown in FIG. 1B illustrates the construction of the hollow shaft 3 and the arrangement of the spacers 5 and the gassing discs 4 on the hollow shaft 3.

Gassing discs 4 and spacers 5 are arranged alternately in a gas-tight contact on the hollow shaft 3. The gas-tight contact is caused by the specific design of the spacer 5 (see also FIG. 2A-C). The gas enters the hollow shaft 3 via the supply line 2, is fed from there into the spacer 5 and from there into the gassing discs. In this way the ceramic gassing discs 4 are supplied with gas and an even bubble production in the medium to be gassed is achieved. The hollow shaft 3 can be made of metallic or non-metallic materials.

Figure 2A:
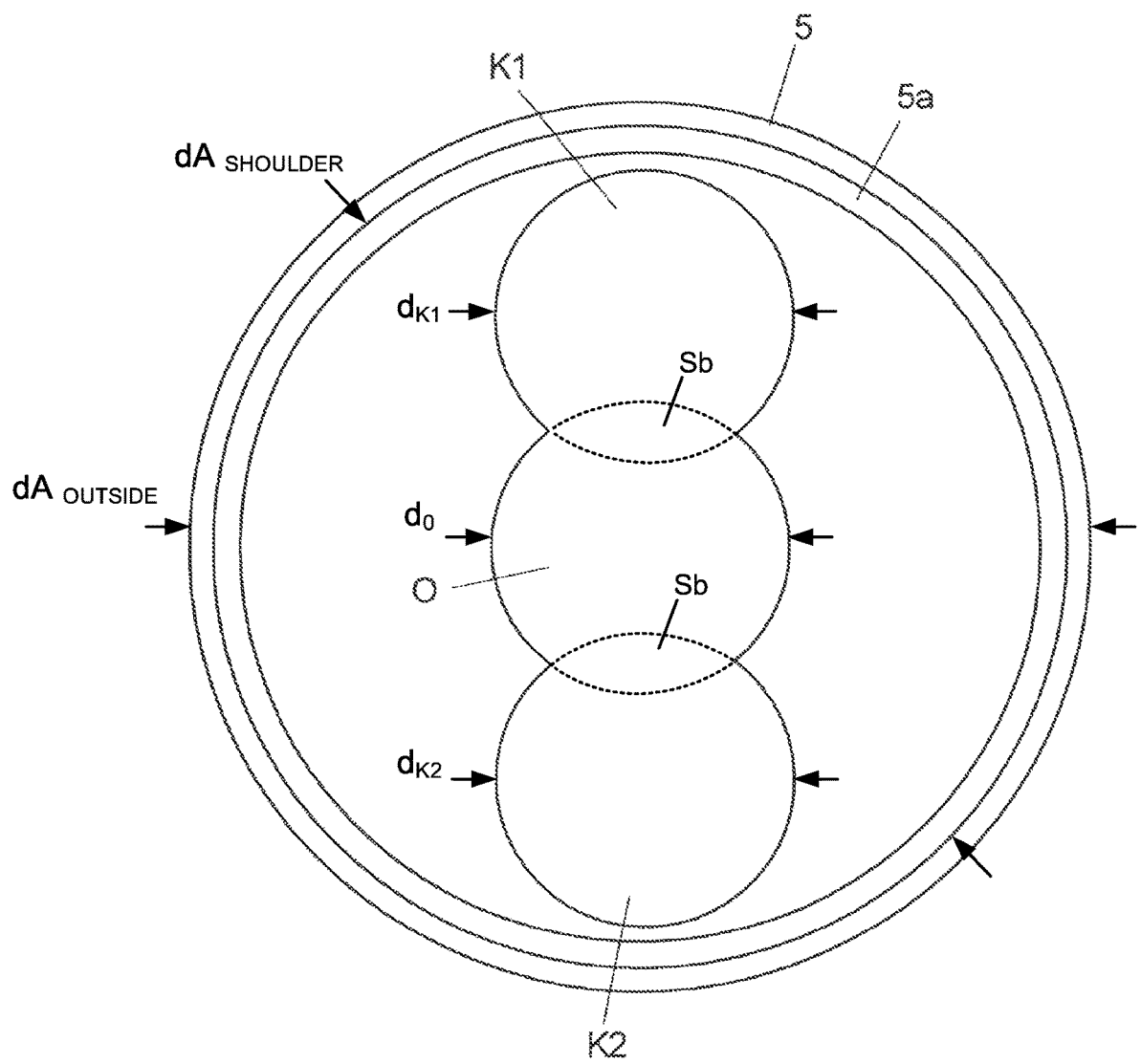
FIG. 2B a second schematic view of a spacer used in the device for generating gas bubbles in a liquid.
FIG. 2C a third schematic view of a spacer used in the device for generating gas bubbles in a liquid.
Figure 2B:
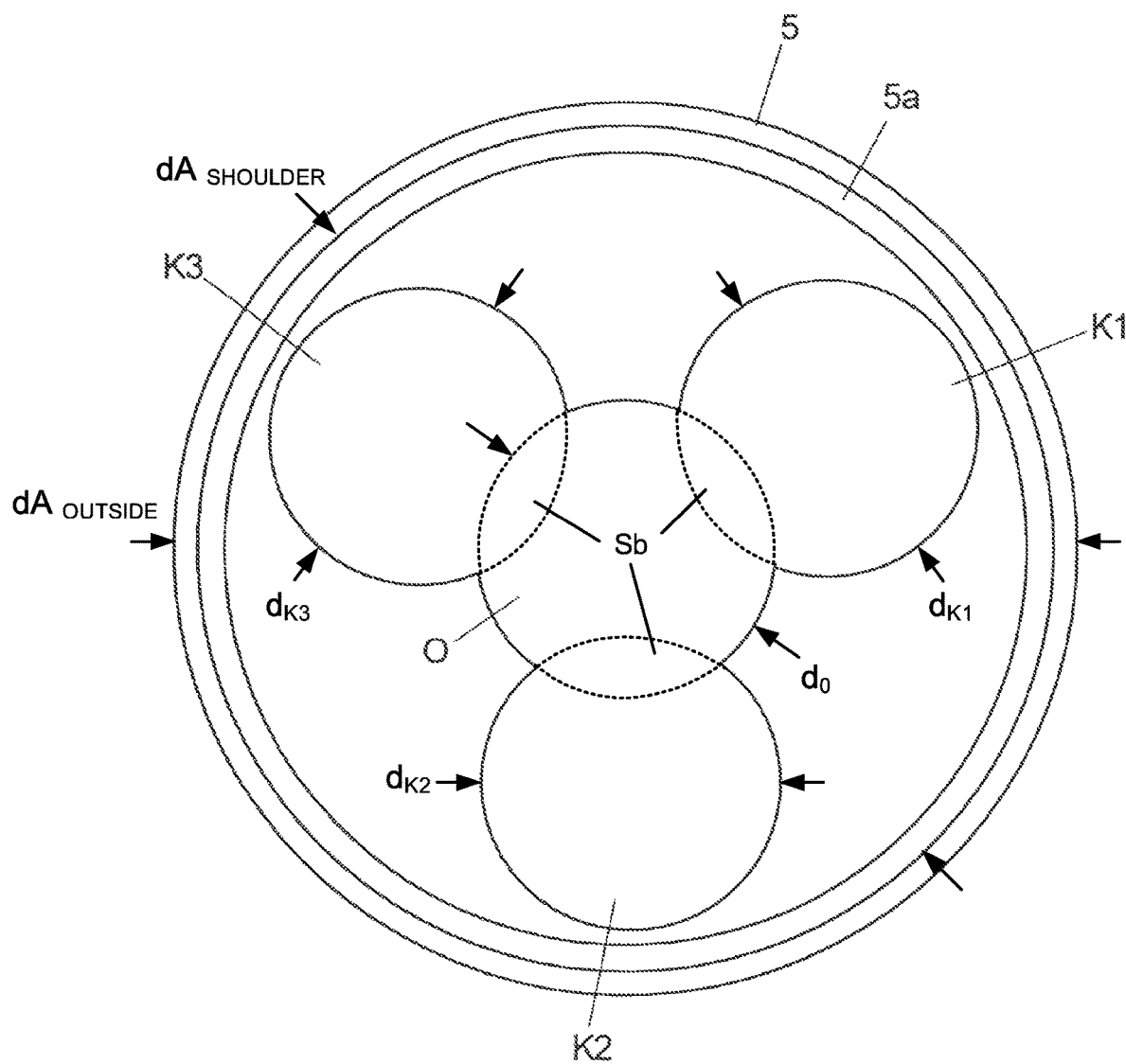

The spacers are shown in more detail in FIGS. 2A to 2C. Each of the spacers 5 has a centered opening (O) with a diameter dO for receiving the hollow shaft and at least two or three, in particular circular chambers (K1, K2, K3) each with a diameter dK1, dK2, dK3. In the case of the embodiment shown in FIGS. 2A-C, the diameters dK1, dK2, dK3 and dO are each 35 mm. However, these values are variable and depend on the overall size of the fixture.

The radii of the centered opening (O) and the radii of the two or three circular chambers (K1, K2, K3) overlap or intersect, so that the centered opening (O) and the two or three chambers (K1, K2, K3) are in open communication with each other at least in the overlap area 5b. The open communication of the centered opening and the chambers allows the compressed gas to flow from the hollow shaft into at least one of the chambers K1, K2, K3 of the spacer 5 in each case. The gas can then continue to enter the gassing discs 4 from one of the chambers K1, K2, K3 of the spacer 5.

In the embodiments of FIGS. 2A-2C, the one spacer 5 with an outer diameter $dA_{Outside}$ has on its circular sides a (centering) shoulder 5a with a diameter $dA_{shoulder}$, where $dA_{shoulder}$ is smaller than $dA_{Outside}$.

The centering shoulder 5a of the spacer is used to receive or make contact with the gassing disc 4. The gas-tight contact between the spacer 5 and the gassing disc 4 is achieved by placing the gassing disc 4 on the shoulder 5a of the spacer 5 and sealing between the gassing disc and the spacer (on the outer radius of the spacer).

The gassing disc 4 is in the form of a ring with an inner circumference with an inner diameter $dB_{inside}$ and an outer circumference with an outer diameter $dB_{outside}$, where the inner diameter $dB_{inside}$ of the gassing disc corresponds to the diameter $dA_{shoulder}$ of the (centering) shoulder of the spacer (see FIG. 2C).

Along the inner circumference of the gassing disc, evenly distributed gas openings 4a are provided (see FIG. 2C).

The introduction of gas from a chamber K1, K2, K3 of the spacer into a gassing disc 4 results from the fact that a gassing disc 4 is arranged between two spacers 5. The gas is conducted from the gas-filled chamber of the spacer into the intermediate space between two spacers, the intermediate space being filled by a gassing disc, and further from this intermediate space via suitable gas supply or gas access openings in the gassing disc into the gassing disc.

Figure 3A:
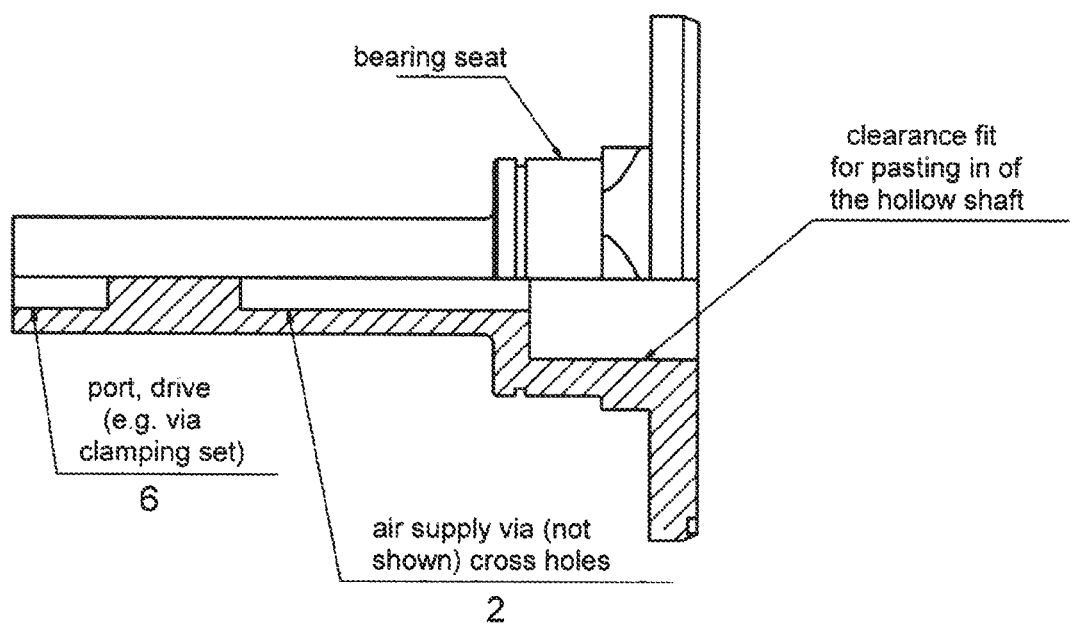
FIG. 3A a schematic view of a shaft end piece of the hollow shaft with air supply and drive.

FIG. 3A shows a shaft end piece in which air supply 2 and drive 6 are combined. The drive 6 for the rotary movement of the shaft can be directly on the shaft, but can also be driven by various mechanical force redirections. For example: Bevel gear, 90° reduction gear. This means that the drive 6 of the shaft can find its position in the medium to be gassed on the one hand, but also outside the medium to be gassed on the other. The drive 6 can be positioned over all known types of drive (e.g.: electric/hydraulic/air pressure).

Shaft 3 is supported in at least two positions, different types of rolling bearings can be used, e.g: ball bearing, deep groove ball bearing, needle bearing, roller bearing, plain bearing.

Gas supply 2 into the rotating shaft must be via at least one seal. This can be positioned inside or outside the medium to be gassed.

An O-ring seals the shaft end piece to the first gassing disc or the first spacer. The O-ring groove can be recessed into the shaft end piece.

Figure 3B:
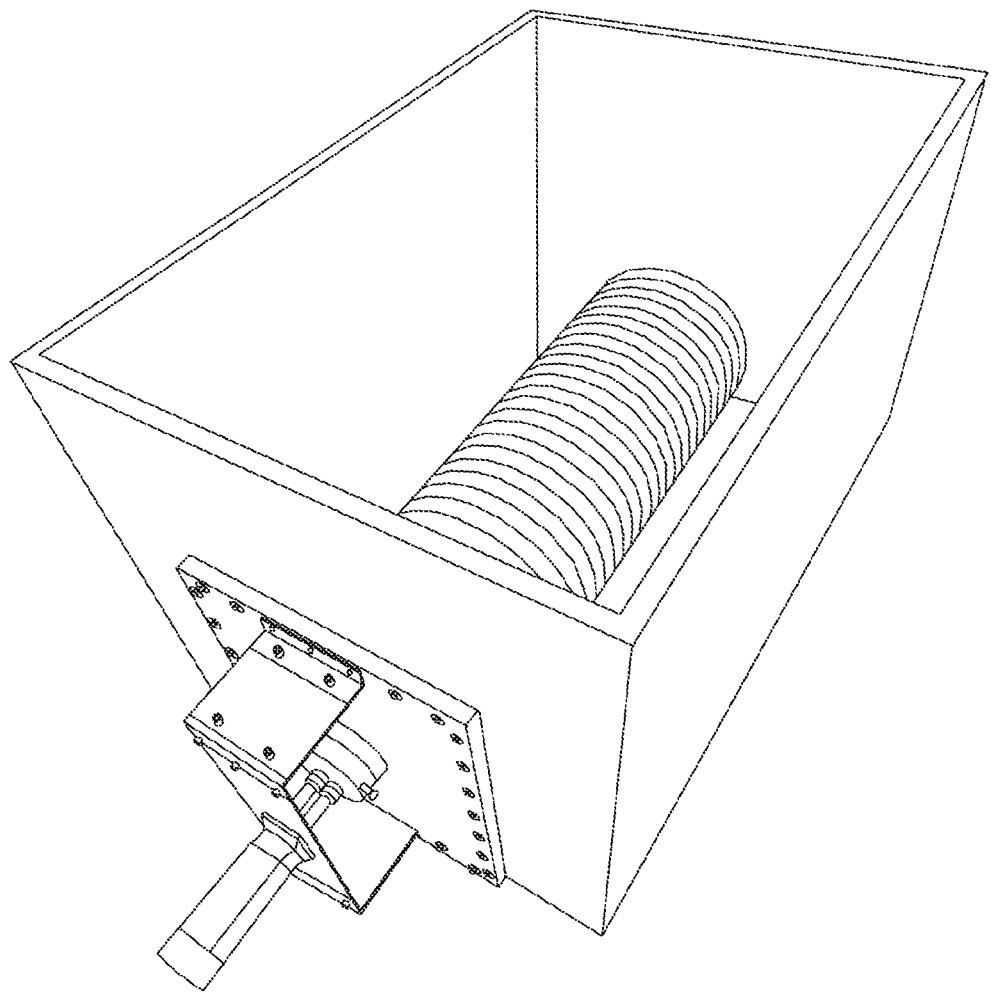
FIG. 3B a schematic view of a first variant of a drive arrangement for the device (slide-in version)

FIG. 3B shows a first variant (slide-in version) for the arrangement of the drive 6 (motor) of device 1. The drive 6 is located outside the tank or vessel in which fixture 1 is immersed and used. The transmission is effected via a rotary union on the wall of the tank.

Figure 3C:
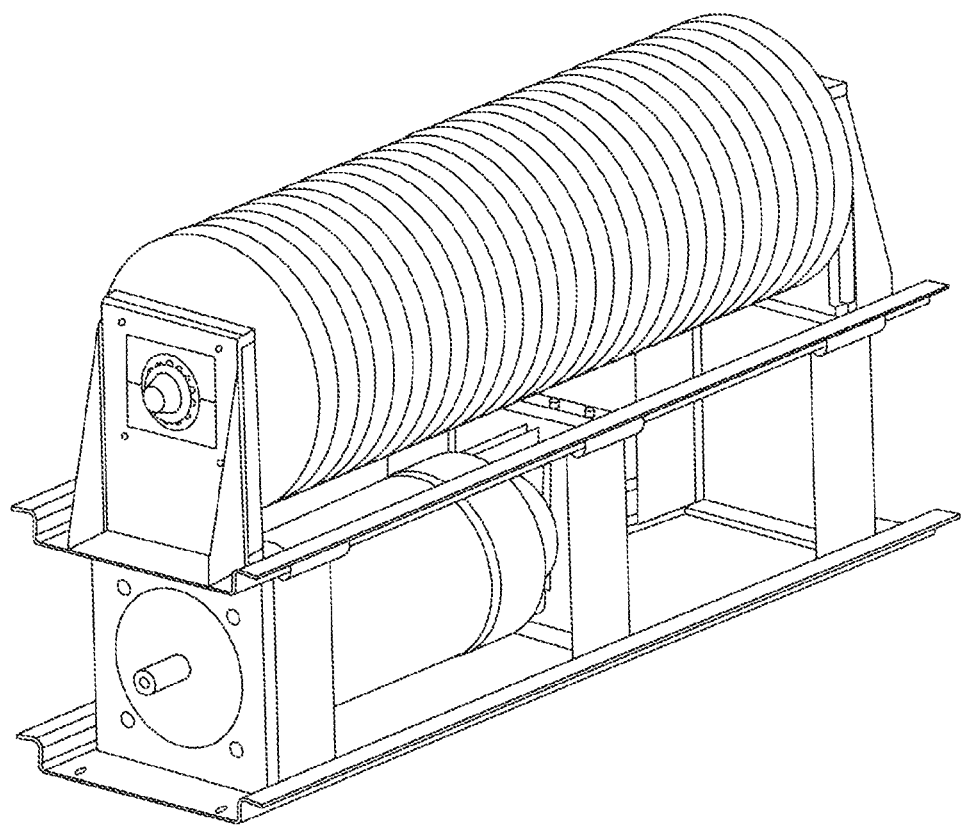
FIG. 3C a schematic view of a second variant of a drive arrangement for the device (drop-in version)

FIG. 3C shows a second version (drop-in version) for the arrangement of drive 6 (motor) of device 1, where drive 6 is located inside the tank or vessel in which device 1 is immersed and used. This version allows an easy integration of the device into existing systems, as no holes have to be drilled through the tank wall.

Figure 4:
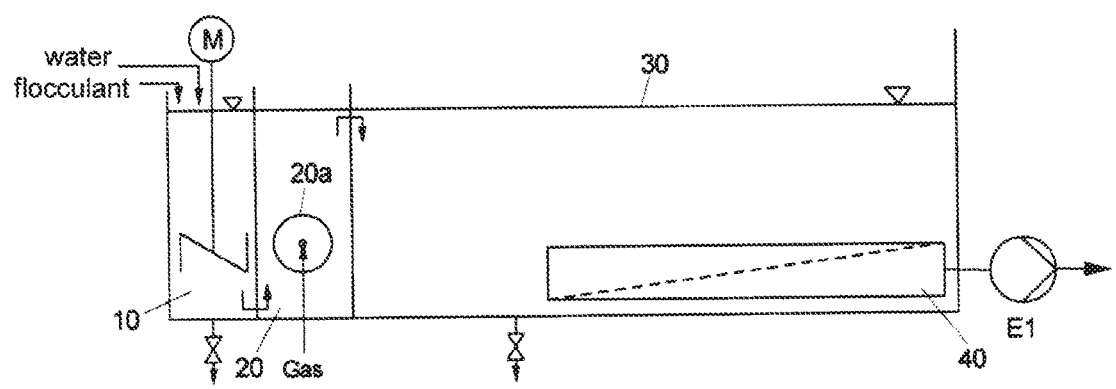
FIG. 4 a schematic side view of a plant for the purification of a liquid comprising a device for generating gas bubbles.

FIG. 4, in turn, shows a schematic diagram of a plant 20 for the purification of a liquid, in particular water, which comprises at least one of the above-mentioned embodiments of a device for generating gas bubbles. The side view of the plant 20 in FIG. 4 shows a flocculation unit 10 into which the water to be purified and the flocculant are introduced. After mixing the water to be purified with the flocculant, for example by using a stirrer, the mixture from the flocculation unit 10 can be introduced via a partition into a further, separate section or container 20, in which at least one hollow shaft 20a with four gassing discs is provided in accordance with the embodiment of FIG. 1.

In the present experimental procedure, dirty water is used that has been mixed with humic substances. All organic substances in the wastewater are simulated by humic substances, which are also produced in nature by normal biological decomposition. To flocculate the humic substances contained in the water, trivalent ions containing iron- and aluminium-containing substances are particularly suitable as precipitants. In this case a $FeCl_3$ solution is used as flocculant. After adding the flocculant using a static mixer, the humic acids contained in the waste water are flocculated in flocculation unit 10 by the flocculant $FeCl_3$.

The dirty water mixed with $FeCl_3$ is then introduced from the flocculation unit 10 into the container 20 containing the gassing device consisting of a hollow shaft with four gassing discs with a volume flow of 400-700 l/h.

Air is injected via the gassing device 20a according to the solution in container 20, whereby micro-bubbles are formed directly in the water mixed with flocculant. The gassing discs or gassing plates of the gassing device rotate in the same direction at a rotational speed of 180 rpm, resulting in a phase shift of 180°. The micro-bubbles formed combine with the flocs to form floc-air bubble agglomerates, which are then introduced into the downstream flotation cell 30. Due to the attachment of the microbubbles to the flocculated organic components, the correspondingly formed agglomerates rise in the flotation cell towards the surface of the liquid in flotation cell 30 and form a solid layer on the water surface, which is separated mechanically, for example by using scrapers. The water thus pre-cleaned is drawn off by a suitable pump through the filtration unit 40 in the flotation cell 30 and is available as cleaned water for further treatment, such as further desalination processes. In order to prevent fouling of the surface of the filtration unit 40, air can be directed directly onto the surface of the filtration unit 40 via hoses or pipes provided with holes, which causes a mechanical removal of deposits on the surface of the filtration unit 40.

The invention claimed is:

1. A device for generating gas bubbles in a liquid in a container, comprising:
   at least one rotatable gas-permeable hollow shaft arranged in at least one container,
   gassing discs arranged on the at least one hollow shaft and spacers arranged between the gassing discs, wherein gassing discs and spacers are arranged alternately on the hollow shaft in gas-tight contact with one another,
   at least one supply line for at least one compressed gas into the interior of the at least one rotatable hollow shaft, wherein
   each of the spacers has at least one centered opening for receiving the hollow shaft and at least two chambers, wherein the at least two chambers are equally spaced around the centered opening,
   wherein the centered opening and the at least two chambers at least partially overlap,
   wherein the centered opening and the at least two chambers are in open communication with one another at least in the overlap region, so that the compressed gas can flow from the hollow shaft into in each case at least one of the chambers of the spacer and can enter the gassing discs from the at least one chamber of the spacer.

2. The device according to claim 1, wherein the at least one hollow shaft is arranged horizontally in the at least one container.

3. The device according to claim 1, wherein the gassing discs are circular in shape and are arranged vertically to the hollow shaft on the at least one hollow shaft.

4. The device according to claim 1, wherein the spacers are circular in shape.

5. The device according to claim 1, wherein the spacer comprises at least three circular chambers, said at least three chambers being equally spaced around the centered opening.

6. The device according to claim 1, wherein the geometries of the chambers of the spacer are the same in each case.

7. The device according to claim 1, wherein the at least one spacer with an external diameter $dA_{outside}$ has, on at least one of its circular sides, a shoulder with a diameter $dA_{shoulder}$, where $dA_{shoulder}$ is smaller than $dA_{outside}$.

8. The device according to claim 7, wherein the at least one shoulder of the spacer serves to receive the gassing disc.

9. The device according to claim 7, wherein the gassing disc is in the form of a ring with an inner circumference with an inner diameter $dB_{inside}$ and an outer circumference with an outer diameter $dB_{outside}$, the inner diameter $dB_{inside}$ of the gassing disc corresponding to the diameter $dA_{shoulder}$ of the shoulder of the spacer with a tolerance.

10. The device according to claim 1, wherein the gassing disc has gas openings uniformly distributed along an inner circumference.

11. The device according to claim 1, wherein the gassing discs are ceramic gassing discs with an average pore size between 0.05 μm and 20 μm.

12. The device according to claim 1, wherein between 2 and 100 gassing discs and spacers are arranged on the at least one rotatable hollow shaft.

13. The device according to claim 1, wherein the at least one supply line for the compressed gas into the hollow shaft and at least one drive for rotating the hollow shaft are provided at one shaft end piece or at different shaft end pieces.

14. A method for generating gas bubbles in a liquid in a container using at least one device according to claim 1, said method comprising:
   introducing a compressed gas into at least one supply line, wherein the compressed gas is introduced directly into the supply line without liquid carrier;
   introducing the compressed gas into the interior of the at least one rotatable hollow shaft, wherein the at least one hollow shaft is arranged horizontally and rotates at a rotational speed between 50 and 400 rpm, and
   introducing the compressed gas into the liquid via the spacers and gassing discs arranged vertically on the horizontal rotating hollow shaft, producing gas bubbles.

15. The method according to claim 14, wherein the bubbles generated in the liquid have a bubble size between 1 μm and 200 μm.

16. The device according to claim 1, wherein the geometries of the diameters of the chambers of the spacer are the same in each case.

17. The device according to claim 1, wherein the gassing discs are ceramic gassing discs with an average pore size between 2 μm and 5 μm.

18. The device according to claim 1, wherein between 15 and 30 gassing discs and spacers are arranged on the at least one rotatable hollow shaft.

19. The method according to claim 14, wherein the at least one hollow shaft rotates at a rotational speed between 180 and 220 rpm.

20. The method according to claim 14, wherein the bubbles generated in the liquid have a bubble size between 45 μm and 50 μm.

\* \* \* \* \*